United States Patent [19]

Gomez

[11] Patent Number: 5,126,046
[45] Date of Patent: Jun. 30, 1992

[54] SOLID MATERIAL BODY FOR THE PURIFICATION OF FLUIDS SUCH AS WATER, AQUEOUS FLUIDS AND LIQUID FUELS

[76] Inventor: Luis Gomez, 2033 W. 73rd St., Hialeah, Fla. 33016

[21] Appl. No.: 644,770

[22] Filed: Jan. 23, 1991

Related U.S. Application Data

[60] Division of Ser. No. 468,661, Jan. 23, 1990, Pat. No. 5,013,450, which is a continuation-in-part of Ser. No. 355,704, May 23, 1989, Pat. No. 4,959,155.

[51] Int. Cl.⁵ .............................................. B01D 15/00
[52] U.S. Cl. .................................. 210/446; 210/542
[58] Field of Search ...................... 210/348, 542, 446

[56] References Cited

U.S. PATENT DOCUMENTS 4,247,398  1/1981  Mohri ................................. 210/222
4,429,665  2/1984  Brown ................................ 123/1 A Primary Examiner—Ivars Cintins
Attorney, Agent, or Firm—Sughrue, Mion, Zinn Macpeak & Seas

[57] ABSTRACT

A method for the purification of fluids such as water, aqueous fluids and liquid fuels, comprises contacting said fluids with a solid material body of a novel alloy which comprises 50 to 60% copper, 20 to 28% zinc, 0.5 to 8% nickel, 0.005 to 2.5% aluminum, 7 to 15% manganese, and 1.3 to 4.5% tin, based on the total weight of the alloy.

2 Claims, 1 Drawing Sheet

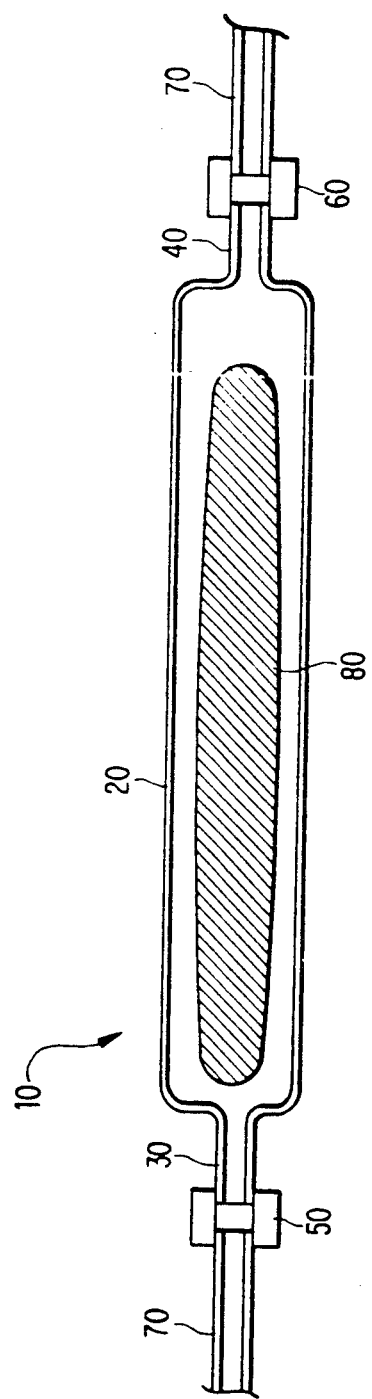
FIGURE

SOLID MATERIAL BODY FOR THE PURIFICATION OF FLUIDS SUCH AS WATER, AQUEOUS FLUIDS AND LIQUID FUELS

This is a divisional of application Ser. No. 07/468,661 filed Jan. 23, 1990, now U.S. Pat. No. 2,073,450, which in turn is a continuation-in-part of Ser. No. 07/355,704 filed May 23, 1989, (now U.S. Pat. No. 4,959,155).

FIELD OF THE INVENTION

The present invention refers to a method and a solid material body for the purification of fluids such as water, aqueous fluids and liquid fuels, and to an alloy for carrying out the same and, more particularly, it is related to a method and an alloy for the treatment of fluids such as water, gasoline and diesel fuel, in order to accomplish the purposes of removing impurities dissolved or suspended in aqueous fluids and of improving the combustion characteristics of liquid fuels used for internal combustion engines.

BACKGROUND OF THE INVENTION

Aqueous fluids, such as water, usually contain metallic salts therein. Said metallic salts, when in solution in said aqueous fluids, are split out into cations and anions, which produce hardness in the water, said hardness causing a tendency to form scale and to corrode metallic piping such as galvanized iron piping and metallic containers through which the fluids flow or wherein the fluids are stored. In order to reduce the corrosive effect of hard water or aqueous fluids flowing through metallic piping or contained in tanks or cooling towers, etc., the only alternatives are either to render the piping or the containers corrosion resistant, or to reduce the corrosive action of the water. Although stainless steel may be used as a corrosion resistant material, this is often impractical or too costly. The removal of the metallic salts from the water, thus softening the water to avoid scale formation and corrosion, therefore, may be regarded as the preferred alternative.

Once the impurities are forced to go into a suspension, these impurities may be removed by purging the system by means of the use of a trap which can also be removed at will.

On the other hand, as it is well known, the issues of energy preservation and pollution are attracting considerable attention, especially in the oil and oil based fuel areas. Considering that the automobile is one of the main consumers of oil in the form of gasoline, a very significant energy preservation could be attained by improving the fuel combustion efficiency in internal combustion engines. Therefore, a great effort is being directed towards the obtention of a larger amount of mechanical work from the automobile engine for the same amount of fuel consumed. A desirable related result of a more efficient combustion is that the engine exhaust emissions are generally cleaner because the fuel is more completely burnt.

Several attempts have been made in the past in order to remove impurities from water or aqueous fluids, as well as in order to improve the combustion characteristics of fuels, but said attempts have been effected through two completely isolated paths of reseach, whereby, as far as applicant knows, these two separate problems have not been jointly attacked up to the present date with the aim of finding one single solution to both of them.

Therefore, in the case of water and aqueous fluids, many processes and devices for removing undesirable salts therefrom have been deviced, such as filters, ultrafiltration devices, reverse osmosis installations and the like, which are either inefficient or extremely costly, whereby the method that has gained more acceptance is the treatment of the water by means of certain chemical compounds which convert the undesirable metal salts into other less deleterious salts which do not produce hardness, as well as the treatment of the water by ion-exchange compounds such as zeolites, which produce a similar result. All of these processes, however, require a strict control of the feedwater and of the water treated thereby, and are relatively costly in their operation.

Other devices have been described for carrying out special treatments of aqueous fluids, such as the magnetic separation apparatus described and claimed in U.S. Pat. No. 4,247,398 patented on Jan. 27, 1981 to Mohri. In this patent, Mohri describes the use of a ferromagnetic metal wool made of an amorphous metal alloy to attract iron powders and the like in order to remove them from water. The alloy used for the ferromagnetic wool, however, although comprising the elements of the alloy of the present invention, is intended for a completely different purpose, that is, for magnetically attracting iron particles suspended in the fluid, whereby it comprises a ferromagnetic metal such as iron, nickel or cobalt, in admixture with a metalloid to provide the amorphous characteristic of the alloy, and an additional metal may also be included. As the alloy of Mohri is intended for being ferromagnetic, however, it must contain a high proportion of said ferromagnetic metal of from at least 50% and relatively low proportions of the additional metal, of at most 15%, and this type of an alloy is unable to remove dissolved salts from a liquid or to improve the combustion efficiency of fuels, and indeed Mohri does not even suggest the possibility of using this alloy for such purposes, since the alloy of Mohri is intended to be used only as a ferromagnetic alloy. Therefore, there is no suggestion in U.S. Pat. No. 4,247,398 for using said alloy in the removal of dissolved salts or in the improvement of fuel efficiency, whereby the device of Mohri does not solve the above described problem.

In the case of fuels, also many efforts have been made in the past for improving the combustion characteristics of fuels. Said efforts include the process described in U.S. Pat. No. 1,376,180 to Wickersham, issued Apr. 26, 1921, which describes the application of electrostatic fields across the fuel as it flows to the combustion chamber; and the process described in U.S. Pat. No. 3,116,726 to Kwartz, issued Jan. 7, 1964, which describes the application of strong magnetic fields through the fuel; as well as other patents within the same line of creating electrostatic or magnetic fields to improve, in a manner still not well understood, the combustion characteristics of liquid fuels.

An effort along a different line of research is represented by U.S. Pat. No. 4,429,665 to Brown, issued Feb. 7, 1984, which describes for the first time the use of an alloy for contacting a liquid fuel therewith to improve the combustion characteristics thereof. The alloy of Brown, however, needs the inclusion of a highly priced metal, namely, silver, whereby the devices manufactured from said alloy may have a relatively high cost which does not compensate for he rather low improvement accomplished thereby, whereby these devices never gained any reasonable commercial success in the market, particularly considering that the preferred commercial embodiment of said device includes a layer of platinum at certain places, which renders the same still more costly.

Applicant is also aware of the existence of numerous different types of water treatment devices to reduce the hardness and the corrosive characteristics thereof, which are based on the use of a contact member made of lead containing alloys. The fact that all of these alloys contain lead as a component, however, represents a serious drawback considering the well known polluting and poisoning characteristics of said metal.

OBJECTS OF THE INVENTION

Having in mind the defects of the prior art systems for the purification of aqueous fluids and for improving the combustion characteristics of liquid fuels, it is an object of the present invention to provide a method for the purification of fluids through the use of a solid alloy material, which reduces the problems associated with said fluids, in an optimum degree.

It is still one other object of the present invention to provide a method for the purification of water and aqueous fluids, and an alloy for carrying out the same, which eliminates the hardness of water and aqueous fluids, and which also eliminates the problems of scale, rust and corrosion in the tubing used to transport same.

One other object of the present invention is to provide a method for the purification of liquid fuels, which provides for an improvement in the purity and combustion characteristics thereof, thus reducing the emission of polluting gases such as hydrocarbons and CO.

The foregoing objects and others ancillary thereto are preferably accomplished as follows:

According to a preferred embodiment of the invention, a method for treating water, aqueous fluids and liquid fuels for purifying same, comprises the steps of passing the fluid through a preferably elongated hollow chamber, provided with input and output ports to receive and discharge the fluid to be treated, and contacting said fluid with a solid material body, placed within said chamber and preferably having an elongated shape, made of a metal alloy of, by weight, about 50 to 60% copper, about 20 to 28% zinc, about 0.5 to 8% nickel, about 0.005 to 2.5% aluminum, about 7 to 15% manganese, and about 1.3 to 4.5% tin.

The novel aspects that are considered characteristic of the present invention are particularly set forth in the appended claims. The invention itself, however, both as to its organization and its method of operation, together with additional objects and advantages thereof, will best be understood from the following description of specific embodiments thereof.

BRIEF DESCRIPTION OF THE DRAWING

The FIGURE is a cross-sectional schematic view of apparatus for the purification of fluids in accordance with the present invention.

DETAILED DESCRIPTION OF THE INVENTION

When water or an aqueous fluid is passed through a hollow, elongated chamber, in contact with an elongate body of the alloy of the invention, arranged within the chamber, there is obtained a purification of the water or aqueous fluid, such that it comes out from the chamber with its hardness reduced to such an extent that the harmful scale, rust and corrosion are avoided in the tubing through which the water or aqueous fluids are conducted, or in the containers containing them, by suspending the salts, rust and materials forming the scale, thus avoiding the reaction of such materials with the system containing them.

In swimming pools, water pools, water tanks, etc., the purification treatment by contact with an alloy of the present invention, reduces the use of chlorine by 70 to 80%, consequently reducing chlorine odor, eye irritation, water hardness and formation of rust and scale in the conduits, pumps and filters though which the water passes. On the other hand, the above mentioned treatment increases the pH of the aqueous fluid or water, thus permitting an increased effectivity of chlorine treatments and avoiding water turbidity.

When, on the other hand, a liquid fuel for an internal combustion engine is passed through a hollow elongated chamber in contact with the solid elongate body of the alloy of the present invention, purification of the same is accomplished, such that the combustion characteristics of the fuel are improved and consequently the polluting emissions are reduced by about 65 to 75%, resulting in lower maintenance costs of the engine, cleaner spark plugs, less tuning up problems, improved injector performance and life, elimination of the knocking action produced by the lower octane gasolines, and consequently resulting in fuel savings, pollution reduction by reducing the hydrocarbon and CO emissions, and increase in engine life.

The method for the purification of fluids such as water, aqueous fluids, and fuel fluids of the present invention, comprises the steps of introducing said fluid through a hollow elongated chamber, contacting said fluid with a solid elongate material body placed within said chamber and constituted by an alloy made of, by weight, about 50 to 60% copper, about 20 to 28% zinc, about 0.5 to 8% nickel; about 0.005 to 2.5% aluminum; about 7 to 15% manganese, and about 1.3 to 4.5% tin, and removing the purified fluid from the chamber.

The treatment chamber of the invention is provided with an inlet port for receiving the fluid under treatment and out outlet port for discharging the same in the purified condition. Said purification chamber may be conveniently inserted in a water, aqueous fluid or liquid fuel line, preferably as close as possible to the source providing said water, aqueous fluid or liquid fuel.

For instance, for steam generators, the feed water is treated for purifying the same at the intake line; for boilers, treatment of the water is preferably carried out at the feed line; for cooling towers, the treatment of the present invention must be made the same as for boilers, and for automobiles, for instance, the fuel purifying treatment of the present invention is preferably effected between the fuel tank and the carburetor, preferably near the fuel tank.

The solid material body which is located within the chamber, is preferably an elongate bar-shaped body, provided with surfaces which are contacted with the fluid chamber to the outlet port thereof.

The FIGURE shows an apparatus in accordance with the present invention broadly designated as 10, which comprises a hollow elongate chamber 20, a fluid inlet 30 at one end of the chamber, a fluid outlet 40 at the other end of the chamber, means 50 and 60 for connecting the fluid inlet and outlet, respectively, to a line 70 for carrying the fluid and an elongate bar 80.

The invention also comprises an alloy from which the solid body is manufactured, said alloy comprising, by weight, from about 50 to 60% copper; about 20 to 28% zinc; about 0.5 to 8% nickel; about 0.005 to 2.5% aluminum; about 7 to 15% manganese; and about 1.3 to 4.5% tin.

Preferably, the alloy of the present invention comprises, by weight, from about 52 to 56% copper; about 23 to 27% zinc; about 3 to 7% nickel; about 0.25 to 1.5% aluminum; about 9 to 13% manganese; and about 2 to 5% tin, all the above percentages being based on the total weight of the alloy.

The present invention will be more clearly understood in the following examples that are given merely for illustrative and non limitative purposes.

EXAMPLE 1

5.5 Kg. of copper, 300 grams of tin, 1.1 Kg. of manganese and 100 grams of aluminum were heated together in a suitable container to form a molten mass, at a temperature of from about 1900 to 2200° F. The container was then heated to a temperature within the range of 2700°-2800° F. and 500 grams of nickel were added to the molten mass. The container was then heated in the range of 3200°-3400° F. and 2.5 Kg. of zinc were added to the molten mass. After a sufficient time of at least 5 minutes, the molten mass was poured into a mold and allowed to solidify into the shape of an elongated bar.

The elongated bar was cooled and thereafter introduced into a cylindrical housing having a fluid inlet and a fluid outlet at opposite ends thereof, and the fluid treatment device thus obtained was electrically insulated by means of an electrical insulating sleeve covering the same, and was installed in the fluid conduit between the fluid pump and the carburetor of an internal combustion engine of a 1987 Mazda 626 vehicle without catalytic converter but with exhaust emissions recycling device, and the treating device was tested in accordance with the following examples:

EXAMPLE 2

The vehicle described in example 1 was subjected to average road tests at speeds from 10 to 55 MPH firstly without the fluid treating device of the invention and thereafter with the fluid treatment device installed as described in example 1.

The vehicle exhaust emissions were analyzed and the results of the two above described tests were as follows:

|  | WITHOUT FLUID TREATMENT DEVICE | WITH TREATMENT DEVICE | PERCENTAGE CHANGE |
|---|---|---|---|
| CO TEST | 8.08 | 6.78 | −16.10% |
| CO2 TEST | 232.33 | 205.83 | −11.41% |
| TOTAL HYDROCARBONS | 0.77 | 0.62 | −19.28% |
| NOX | 4.18 | 3.92 | −6.34% |
| FUEL CONSUMPTION | 10.50 | 9.27 | −11.74% |

EXAMPLE 3

The vehicle was subjected to tests similar to those described in example 2, but at urban highway speed of an average of 20.3 KPH.

The results of the exhaust emmision tests were as follows:

|  | WITHOUT FLUID TREATMENT DEVICE | WITH TREATMENT DEVICE | PERCENTAGE CHANGE |
|---|---|---|---|
| CO TEST | 21.66 | 17.13 | −20.91% |
| CO2 TEST | 333.20 | 264.90 | −20.50% |
| TOTAL HYDROCARBONS | 1.52 | 1.09 | −28.29% |
| NOX | 5.78 | 4.49 | −22.32% |
| FUEL CONSUMPTION | 15.78 | 12.52 | −20.66% |

EXAMPLE 4

The treatment device described in example 1 was also tested in the described vehicle at suburban highway speed of an average of 40.2 KPH, with the following results having been obtained in the exhaust emissions of said vehicle:

|  | WITHOUT FLUID TREATMENT DEVICE | WITH TREATMENT DEVICE | PERCENTAGE CHANGE |
|---|---|---|---|
| CO TEST | 5.76 | 5.20 | −9.72% |
| CO2 TEST | 212.10 | 207.20 | −2.31% |
| TOTAL HYDROCARBONS | 0.72 | 0.68 | −5.56% |
| NOX | 4.17 | 4.23 | −1.44% |
| FUEL CONSUMPTION | 9.48 | 9.23 | −2.64% |

EXAMPLE 5

The device of the present invention as described in example 1 was also tested by running the vehicle at rural highway speed at an average of 59.7 KPH, with the following results:

|  | WITHOUT FLUID TREATMENT DEVICE | WITH TREATMENT DEVICE | PERCENTAGE CHANGE |
|---|---|---|---|
| CO TEST | 3.89 | 3.69 | −5.14% |
| CO2 TEST | 188.20 | 181.40 | −3.61% |
| TOTAL HYDROCARBONS | 0.57 | 0.48 | −15.79% |

|  | WITHOUT FLUID TREATMENT DEVICE | WITH TREATMENT DEVICE | PERCENTAGE CHANGE |
| --- | --- | --- | --- |
| NOX | 3.48 | 3.94 | 13.22% |
| FUEL CONSUMPTION | 8.32 | 8.01 | −3.73% |

EXAMPLE 6

The device described in example 1 was also tested by racing the vehicle at motor way speed at an average of 90.3 KPH, with the following results:

|  | WITHOUT FLUID TREATMENT DEVICE | WITH TREATMENT DEVICE | PERCENTAGE CHANGE |
| --- | --- | --- | --- |
| CO TEST | 0.99 | 1.08 | 0.09% |
| CO2 TEST | 195.80 | 169.80 | −13.28% |
| TOTAL HYDROCARBONS | 0.25 | 0.22 | −12.00% |
| NOX | 3.29 | 3.00 | −8.81% |
| FUEL CONSUMPTION | 8.41 | 7.30 | −13.20% |

As it may be seen from the above, the fluid treatment device in accordance with the present invention produces a significant decrease in the contaminant gases in the exhaust emissions of the vehicle tested, and also accomplishes a remarkable decrease in the fuel consumption of the vehicle, particularly at high and low speeds, said saving in fuel consumption being somewhat lower at motoring speeds.

EXAMPLE 7

A water treatment device similar to the fuel treatment device described in example 1 was prepared from an alloy containing the following proportions of ingredients: 23% zinc, 4% nickel, 1% aluminum, 10% manganese, 3% thin and 59% copper.

The thus obtained water treatment device was installed in the feed water line of various devices as will be described in the following examples, and the results of its effects on the water were analyzed.

EXAMPLE 8

The device described in example 7 was inserted in the feed water line of a boiler system that confronted very serious problems for trying to keep the system in optimum operating conditions, inasmuch as the hardness, alkalinity and total solids of the water were targeted at very high or very low values and water treatment product consumption was somewhat high. After the water treatment unit described in example 7 was installed, the results of the above parameters were corrected in such a manner that after such installation, it has now been easy to control the waters for the boiler.

A sample feed water was analyzed before and after the installation of the water treatment unit in the boiler system described above, and the results obtained for the various parameters of the water were as follows:

| PARAMETERS | BEFORE TREATMENT | AFTER TREATMENT |
| --- | --- | --- |
| Hardness | 4.0 | 0.0 |
| pH | 11.0 | 10.5 |
| Solids | 3360.0 | 3000.0 |
| Alkalinity F | 245.0 | 357.0 |
| Alkalinity M | 382.0 | 330.0 |
| Chlorides | 78.0 | 23.0 |
| Carbonates | 252.0 | 412.0 |
| Bicarbonates | 0.0 | 0.0 |
| Sulphates | 321.0 | 156.7 |
| Hydroxides | 65.3 | 57.0 |
| Sulphides | 20.0 | 10.0 |
| Phosphates | 30.0 | 20.0 |

The above indicates clear evidence of how some of the parameters that are considered harmful for the equipment were decreased, and it must be pointed out that the intake of water treatment reactants was lower than the previous dosification customarily used in this boiler.

EXAMPLE 9

The water treatment unit described in example 7 was installed in one of the pools of a pair of identical swimming pools of a hotel, in order to compare the effects of the unit in the waters of the pools.

The pool wherein the unit was installed, was subjected to a continued conventional chloride treatment and the witness pool received exactly the same treatment, with the following results having been obtained:

| Residual chlorine in pool without unit: | 3.0 ppm initially |
| --- | --- |
| Residual chlorine in pool with unit: | 3.0 ppm initially |
| After five hours of the chlorine application | |
| Residual chlorine in pool without unit: | 0.0 ppm |
| Residual chlorine in pool with unit | 2.0 ppm |

At this moment the witness pool was chlorinated, leaving the other as is, and the following was noticed:

| Residual chlorine in pool without unit: | 3.0 ppm |
| --- | --- |
| Residual chlorine in pool with unit: | 2.0 ppm |
| After five hours: | |
| Residual chlorine in pool without unit: | 0.3 ppm |
| Residual chlorine in pool with unit: | 0.6 ppm |

As it may be seen from the above results, the water treatment unit of the present invention causes the residual chlorine to remain for a longer time (almost twice as must) in contact with the water and, furthermore, during the same time and with half the dose, an even higher chlorine concentration is obtained.

A bacteriological analysis was also made to the water from both pools while keeping the same chlorine residue (3.0 ppm) with the following results having been obtained.

| | |
|---|---|
| Number of colonies/100 ml. pool without unit | 54 |
| Number of colonies/100 ml. pool with unit | 4 |
| Aerobacter/100 ml. pool without unit | 17 |
| Aerobacter/100 ml. pool with unit | 0 |
| Colibacillus/100 ml. negative in both tests | |
| Cohaeregeneous Bacteria/100 ml. | |
| Pool without unit | 5 |
| Pool with unit | 0 |

At the end of the day, when both pools contained a very low chlorine residue, the results were the following:

| | |
|---|---|
| Colonies/100 ml. pool without unit | 76 |
| Colonies/100 ml. pool with unit | 2 |
| Aerobacter/100 ml. pool without unit | 33 |
| Aerobacter/100 ml. pool with unit | 7 |
| Pool with and without unit negative in colibacillus | |
| Cohaerogenous/100 ml. | |
| Pool with unit | 9 |
| Pool without unit | 38 |

As it may be noted from the above, either with chlorine or without chlorine the bactericide effect of the water treatment unit of the present invention is evident, since its effects are even higher than those of chlorine alone, for fulfilling the purpose of purifying the water, and the residual effects are kept for longer periods even when chlorine is no longer present in the water.

EXAMPLE 10

The water treatment device described in example 7 was installed in the water line of a home in order to treat the tap water, and the water was analyzed before the treatment and after the treatment, with the following results having been obtained.

| Sample Description | mg/l (ppm) |
|---|---|
| Tap Water | |
| Calcium | 48.8 |
| Magnesium | 28.1 |
| Bicarbonate | 30.6 |
| pH | 8.85 units |
| Water after treatmnt | |
| Calcium | 45.1 |
| Magnesium | 21.3 |
| Bicarbonate | 18.0 |
| pH | 8.56 units |

EXAMPLE 11

The water treatment device as described in example 7 was used for passing therethrough a blackish water received and returned to the U.S. from the Grand Cayman Islands, and the results of the analysis of said blackish water before and after treatment (3 passes were used for the treatment) were as follows:

| | AFTER TREATMENT (3 Passes) | BEFORE TREATMENT |
|---|---|---|
| Specific Gravity | 1.0027 | 1.0029 |
| pH | 8.3 | 8.7 |
| Conductivity, microhoms/cm | 7200 | 7300 |
| Silica, SiO$_2$, mg/l | 0.69 | 0.20 |
| Aluminum, Al, mg/l | less than 0.05 | less than 0.05 |
| Calcium, Ca, mg/l | 148 | 180 |
| Magnesium, Mg, mg/l | 195 | 212 |
| Sodium, Na, mg/l | 1280 | 1280 |
| Potassium, K, mg/l | 49.8 | 49.9 |
| Carbonate, CO$_3$, mg/l | 28.8 | 57.6 |
| Bicarbonate, HCO$_3$, mg/l | 464 | 474 |
| Sulfate, SO$_4$, mg/l | 57 | 67 |
| Chloride, Cl, mg/l | 2500 | 2500 |
| Fluoride, F, mg/l | 0.42 | 0.53 |
| Nitrate, NO$_3$, mg/l | 20.2 | 23.8 |
| P-Alkalinity as CaCO$_3$, mg/l | 48 | 96 |
| T-Alkalinity as CaCO$_3$, mg/l | 380 | 388 |
| Total Hardness as CaCO$_3$, mg/l | 1170 | 1320 |
| Total Dissolved Solids, mg/l | 4515 | 4665 |
| Total Suspended Solids, mg/l | 40 | 1000 |

Although various specific embodiments of the present invention have been described above, it must be understood that many modifications therein are possible. The present invention, therefore, must not be restricted except insofar as is necessitated by the prior art and by the spirit of the appended claims.

What is claimed is:

1. An apparatus for the purification of fluids such as water, aqueous fluids and liquid fuels comprising a hollow elongate chamber, a fluid inlet at one end of said chamber, a fluid outlet at the opposite end of said chamber, means for connecting said fluid inlet and outlet to a line carrying said fluid, and an elongate bar of a metal alloy within said elongate chamber, the dimensions of said bar being such as compared to the dimensions of said chamber that an annular fluid passage is left therebetween for permitting direct contact of said fluid with the surface of said bar, the metal alloy of said bar comprising 50 to 60% copper, 20 to 28% zinc, 0.5 to 8% nickel, 0.005 to 2.5% aluminum, 7 to 15% manganese and 1.3 to 4.5% tin, based on the total weight of the alloy.

2. An apparatus according to claim 1 wherein said alloy comprises 52 to 57% copper, 23 to 27% zinc, 3 to 7% nickel, 0.25 to 1.5% aluminum, 9 to 15% manganese, and 2 to 4% tin, based on the total weight of the alloy.

* * * * *